Oct. 7, 1969 S. G. BURKE 3,471,047
PALLET LOADING APPARATUS
Filed Sept. 13, 1967 7 Sheets-Sheet 2

Shirley G. Burke
INVENTOR.

BY *Clarence A. O'Brien*
and *Harvey B. Jacobson*
Attorneys

Oct. 7, 1969  S. G. BURKE  3,471,047

PALLET LOADING APPARATUS

Filed Sept. 13, 1967  7 Sheets-Sheet 2

Shirley G. Burke
INVENTOR.

BY *Clarence A. O'Brien*
and *Harvey B. Jackson*
Attorneys

Oct. 7, 1969  S. G. BURKE  3,471,047
PALLET LOADING APPARATUS
Filed Sept. 13, 1967
7 Sheets-Sheet 3

Shirley G. Burke
INVENTOR.

BY *Clarence A. O'Brien*
*and Harvey B. Jacobson*
Attorneys

Oct. 7, 1969  S. G. BURKE  3,471,047
PALLET LOADING APPARATUS
Filed Sept. 13, 1967  7 Sheets-Sheet 5

Shirley G. Burke
INVENTOR.

BY *Elmer A. O'Brien*
and *Harvey B. Jacobson*
Attorneys

United States Patent Office 3,471,047
Patented Oct. 7, 1969

1

3,471,047
PALLET LOADING APPARATUS
Shirley G. Burke, P.O. Box 23, Forest, Tex. 75945
Filed Sept. 13, 1967, Ser. No. 667,437
Int. Cl. B60p *1/00, 1/64;* B65g *67/04*
U.S. Cl. 214—505                         18 Claims

ABSTRACT OF THE DISCLOSURE

Apparatus for handling pallets comprising, in combination with a trailer or the like, a selectively lowerable rear ramp, winch means for moving a pallet onto the ramp, dolly means for receiving the pallet, raising the pallet, moving the pallet forward, rotating the pallet crosswise across the trailer body, and locating the pallet at the forwardmost available position. The dolly moves along the length of the trailer body so as to successively position pallets crosswise across the trailer body until a fully loaded condition exists, thereby obtaining a maximum loaded condition for the trailer.

---

The instant invention relates to new and useful improvements in pallet loading apparatus for trailers, truck beds, and the like, and more particularly relates to apparatus which provides for the automatic loading of pallets in a manner so as to obtain a maximum utilization of the loading space.

One of the objects of the instant invention is to provide apparatus which, through a trailer mounted mobile dolly, will move a longitudinally introduced loaded pallet forwardly along the length of the trailer, turn the pallet crosswise on the tralier so as to require a minimum amount of loaded space, and deposit the transverse pallet at the forwardmost available position.

Another object of the instant invention is to provide pallet handling apparatus which enables a single operator to effectively load and position the pallets on a trailer or the like in a rapid and efficient manner which eliminates any necessity of handling the wood or other load actually carried by the pallet at any time during the loading of the pallets or the unloading of the pallets relative to the trailer.

Further, it is an object of the instant invention to provide apparatus which while particularly adapted for the handling of wood stacking pallets, can in fact be utilized in the loading and positioning of any bulk load on any transport vehicle.

Basically, in achieving the above objects, a longitudinally traveling dolly is mounted between a pair of load supporting guide rails, this dolly being capable of receiving, raising and rotating a load at least 90° whereby the greater length of the load will extend transversely across the trailer and hence result in a maximum utilization of the loading space. The rear of the vehicle being loaded will include a pivotal ramp for selective lowering in a manner so as to facilitate an initial winching of the load thereonto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

2

Referring now more specifically to the drawings, reference numeral 20 is used to generally designate a load transporting body. This body 20 can be in the nature of a trailer, as illustrated, a truck bed, or the like of a length sufficient so as to accommodate several loaded pallets 22 thereon.

Figure 1:
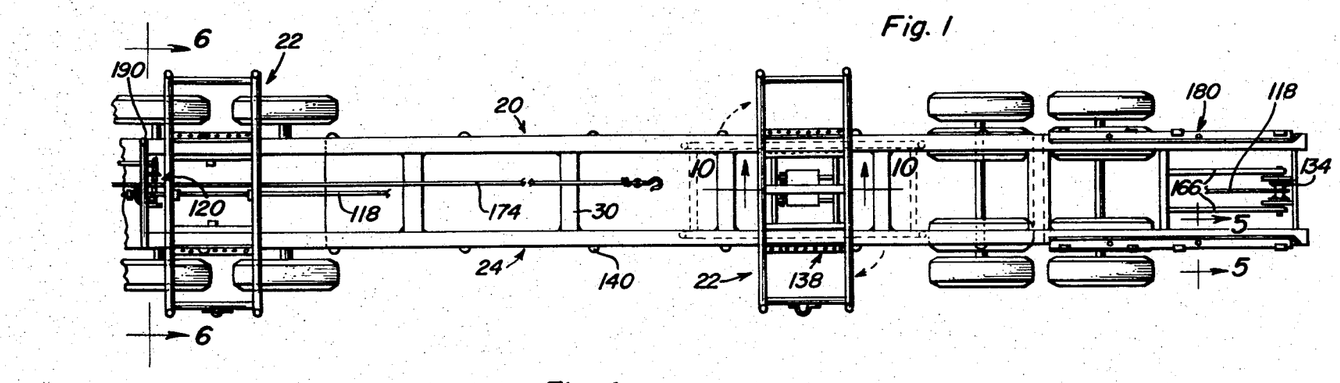
FIGURE 1 is a top plan view of the pallet loading and transporting construction.
Figure 2:
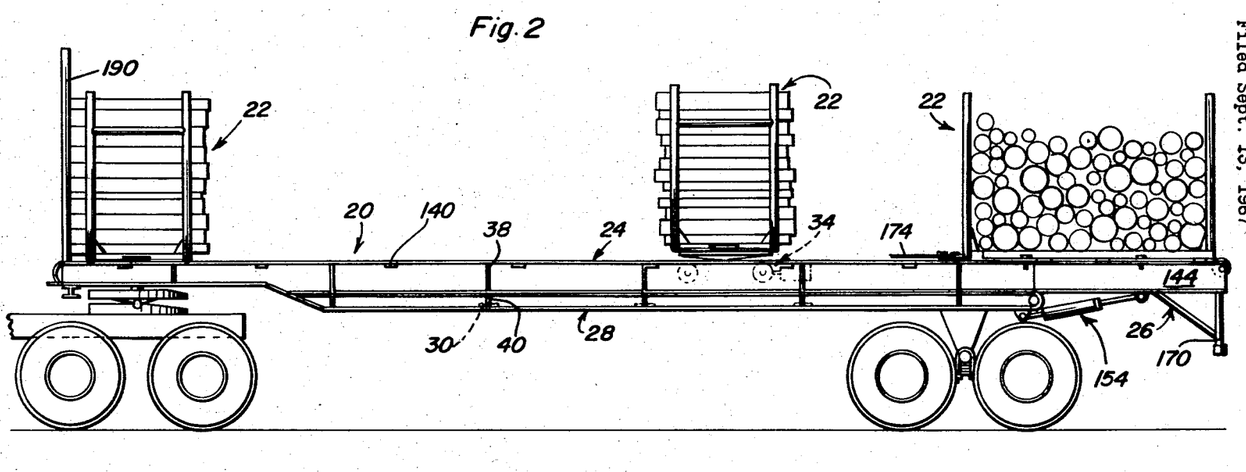
FIGURE 2 is a side elevational view of the apparatus, including the trailer, with pallets thereon in the various positions assured during the loading operation.

The load receiving and transporting body 20 is to include a pair of full length laterally spaced longitudinally extending guide and support rails 24. These rails 24, in the illustrated embodiment, comprise a pair of wide flange I-beams which actually form the main structral members of the body 20. With reference to FIGURE 2, it will be noted that these I-beam rails 24, along a major portion of the length thereof forwardly from the rearwardly located loading ramp 26, each has an underlying strengthening or rigidifying I-beam 28 which are in turn transversely braced by beams 30 more clearly illustrated in FIGURES 1 and 8.

Figure 10:
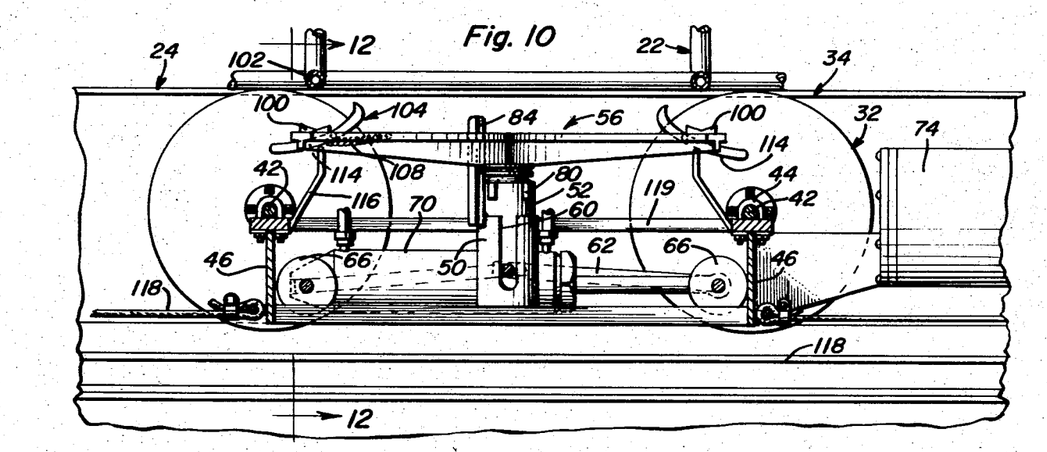
FIGURE 10 is a cross-sectional view taken substantially on a plane passing along line 10—10 in FIGURE 1 and illustrating the pallet moving dolly.
Figure 12:
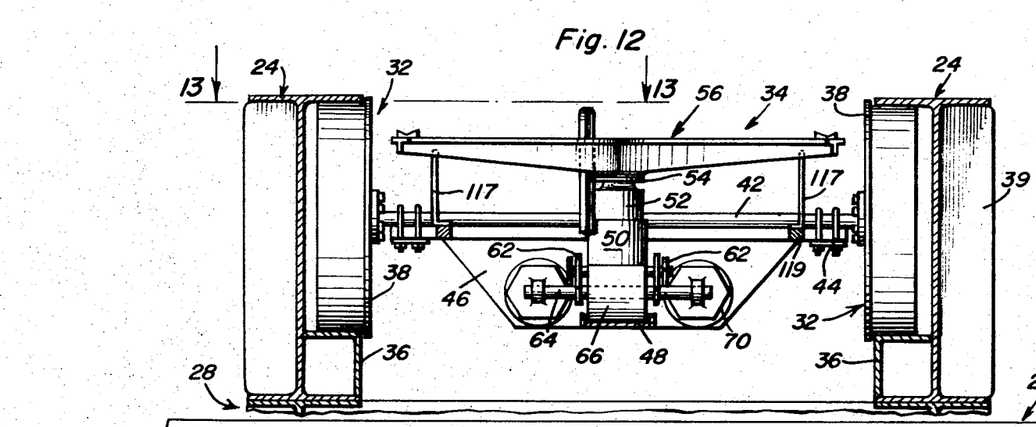
FIGURE 12 is a cross-sectional view taken substantially on a plane passing along line 12—12 in FIGURE 10.
Figure 13:
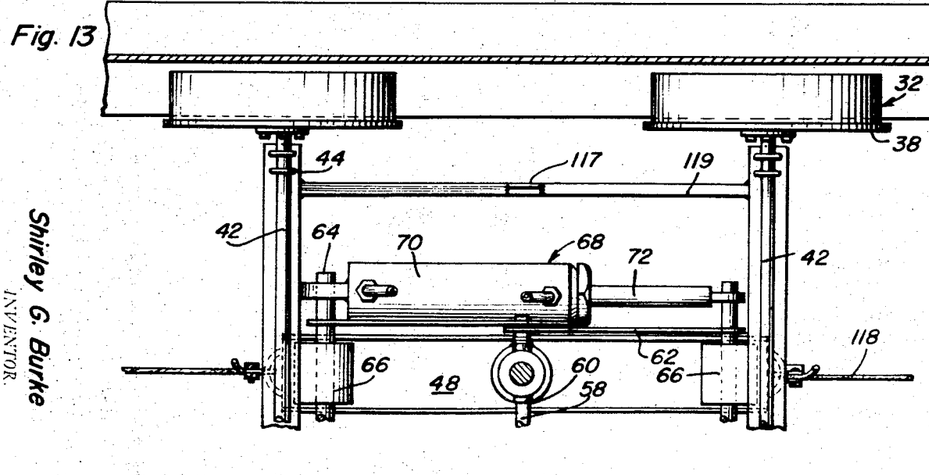
FIGURE 13 is a cross-sectional view taken substantially on a plane passing along line 13—13 in FIGURE 12.

With reference to FIGURES 10 and 12, it will be noted that the guide rails 24 function so as to rotatably receive and guide the flanged wheels 32 of the pallet moving and positioning dolly 34. In order to adapt the height of the rails 24 to the diameter of the particular dolly wheels 32, it will be noted that angle bar fillers 36 have been welded along the lower inner side of each of the I-beam rails 24 so as to provide a rolling surface for the corresponding wheels 32 at a height whereby a substantial confining of the wheels 32 between the rolling surface and the top flange will result with the wheel flange 38 engaging against the edge of the corresponding upper rail flange and the filler angle 36 so as to properly locate the wheels 32. It will thus be appreciated that the wheels 32 will be confined in a manner whereby movement of the dolly 34 in a longitudinal direction is possible with there being no danger of the dolly lifting or otherwise riding out of the guide rails 24. Incidentally, with continued reference to FIGURE 12, it will be noted that vertical braces 39 are welded between the upper and lower guide rail flanges and against the outer faces of the vertical webs for introducing an additional degree of stability thereto, such braces 39 being provided at longitudinally spaced points along the rails 24 with similar braces 40 also being provided in connection with the subjacent rigidifying I-beams 28.

With specific reference to the construction of the dolly 34, it will be appreciated that such includes front and rear pairs of the guide rail engaged wheels or rollers 32, each pair of wheels being rotatably mounted on a transversely extending axle 42 which has, rigidly secured thereto by a plurality of U-bolts 44, a depending beam 46 paralleling the corresponding axle 42 inward of the opposed associated wheels 32. Each beam 46, noting FIGURE 10, will preferably include an upper horizontal flange portion seating directly against the undersurface of the corresponding axle 42, and a centrally located depending web portion.

Figure 11:
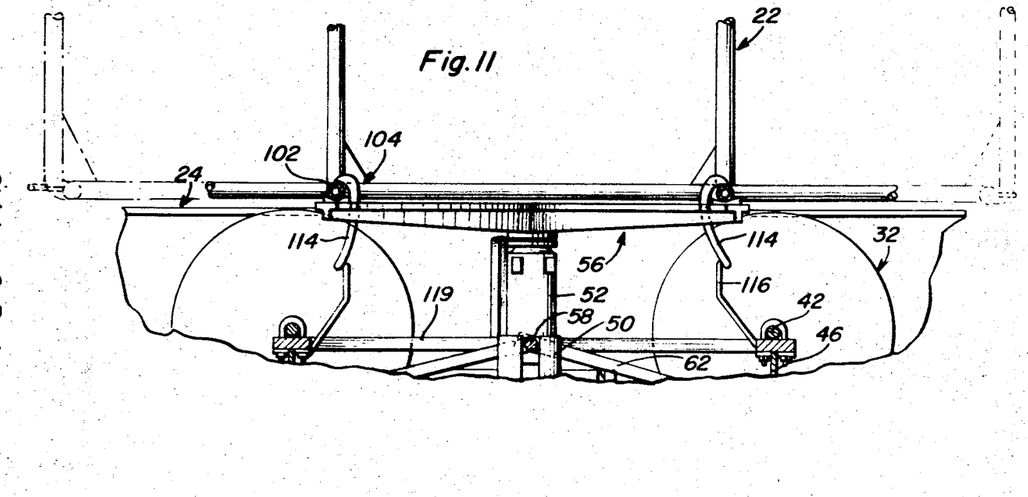
FIGURE 11 is a partial cross-sectional view similar to FIGURE 10 illustrating the dolly in an expanded position with the pallet being slightly elevated.

Extending transversely between the beams 46, and hence longitudinally of the transporting body 20, is an upwardly directed channel beam track 48, the opposite ends of which are of course rigidly welded or otherwise secured to the beams 46. Affixed centrally to the track 48 and projecting vertically therefrom is a lift cylinder 50 within which a vertically extensible shaft or piston 52 is slidably positioned. The upper end of the piston 52 rotatably mounts, through a roller bearing unit 54, the pallet carrying head 56. Rigid with the extensible shaft 52 and projecting radially therefrom at diametrically opposed points are a pair of pins or rods 58, the shaft receiving cylinder 50 being provided with opposed vertical slots 60 therein for the accommodation of the pins 58 during the vertical movement of the shaft 52. The outer ends of the pins 58, which as will be appreciated from the drawings extend transversely across the track 48, each pivotally receive the inner ends of a pair of longitudinally extending links 62, the outer ends of which are pivotally engaged with a pair of shafts or axles 64 transversely spanning the opposite end portions of the track 48 just inward of the dolly support beams 46. Each of the axles 64 rotatably mounts a central roller 66 positioned within the track 48 for rolling movement therealong. Thus, upon a movement of the axles 64 inwardly toward each other, guided by the central track received supporting rollers 66, it will be appreciated that an upward movement of the link-engaged pins 58 will result, this in turn producing an elevation of the pallet carrying head 56. The two extreme positions of the raising elements are illustrated in FIGURES 10 and 11 with the links 62, at the lowered position, being angled slightly upward so as to insure a proper upward movement of the shaft or piston 52 upon a movement of the axles 64 inwardly toward each other. Appropriate means, if necessary, can also be provided to fix the upper limit of movement of shaft 52. The actual movement of the axles 64 is effected by means of a pair of fluid rams 68, each comprising a cylinder 70 and a piston rod 72 extensible and retractable relative to the cylinder 70. Each ram 68 is engaged at the outer ends of the cylinder 70 and rod 72 thereof, with the corresponding ends of the front and rear axles 64 and are controlled in a synchronized manner for producing the desired movement of the axles 64 either toward each other when raising the carrying head 56 or away from each other when lowering the carrying head 56. The controls for the rams 68, as well as any necessary fluid reservoir can be located at any convenient position depending upon the particular type of transport vehicle involved. For example, a hydraulic system, including an electric motor, pump and reservoir, can be mounted directly on the dolly as suggested at reference numeral 74 in FIGURE 10.

Upon a raising of the carrying head 56 so as to lift a superimposed pallet 22 upwardly off of the parallel guide rails 24, it is desirable, for reasons which shall be detailed subsequently, to rotate the carrying head 56, and hence the pallet 22 thereon, through 90°. This is made possible through the bearing support 54 for the carrying head 56 and can be effected either manually as suggested in FIGURE 14 or hydraulically as suggested in FIGURE 15.

Figure 14:
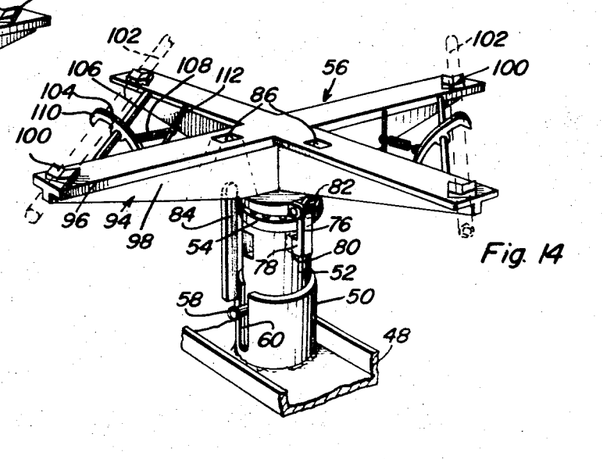
FIGURE 14 is a perspective detail of the pallet grasping and raising portion of the dolly.

If the rotation of the carrying head is to be effected manually, as in FIGURE 14, a manually releasable latch 76 is provided for locking the carrying head 56 in either of its two rotated positions. This latch 76 is hingedly mounted either directly on the carrying head 56 or to the upper portion of the bearing unit 54 rigid therewith with the latch 76 depending therefrom and terminating at its lower end in an inturned portion 78 which is selectively received in a pair of seats or recesses 80 defined in the upper portion of the shaft 52 at points 90° apart. It is contemplated that this latch 76 be spring-urged in any appropriate manner so as to resiliently bias the locking end 78 inwardly into an aligned recess 80. Further, a release of the latch end 78 can be simply effected through merely an inward push on the handle end 82 of the latch which is integrally formed therewith and projects upwardly above the point at which the latch 76 is pivotally mounted. Thus, when it becomes desirable to rotate the carrying head 56, the latch 76 is manually released and the carrying head 56, along with any superimposed load, swung about to the new position, at which point the latch 76 is reengaged.

In order to avoid any premature rotation of the carrying head 56, a vertically extending rigid retaining or positioning finger 84 is affixed to the cylinder 50 and projects upwardly therefrom for selective engagement within either of two vertical passages 86 in the carrying head 56, such passages 86 being 90° apart and aligning with the finger 84 in the two rotated positions of the carrying head 56. The relationship between the finger 84 and the slots 86 is such so as to preclude a rotation of the carrying head 56 until a predetermined height is reached, such height being sufficient so as to engage and raise the pallet. Upon a reaching of this predetermined height, the carrying head 56 will be raised above the upper end of the positioning finger 84 and hence free to rotate. In order to facilitate an engagement of the finger 84 during a subsequent lowering of the carrying head 56, it will be noted that each passage 86 is provided with a wider lower end and a decreasing area upwardly therefrom.

Figure 15:
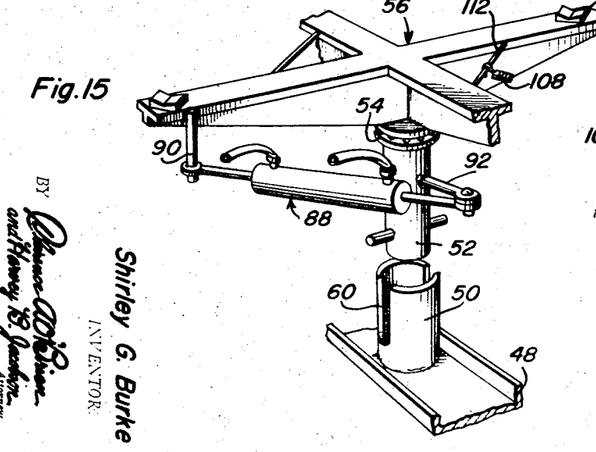
FIGURE 15 is a perspective view of a slightly modified form of the structure of FIGURE 14.

FIGURE 15 is of interest in illustrating the utilization of a double-acting hydraulic ram 88 for effecting and controlling the rotation of the carrying head 56. This is effected basically by engaging the extensible and retractable ram unit 88 between a vertically depending rod 90 on the carrying head and a radially projecting rod 92 on the shaft or piston 52, the rod 90 being of a length so as to position the ram 88 horizontally with the degree of extension and retraction of the ram 88 being sufficient so as to achieve a 90° rotation of the carrying head 56. It will of course be appreciated that any appropriate hydraulic system can be utilized for the controlling of the ram 88, for example the system generally indicated by reference numeral 74 in FIGURE 10.

The carrying head 56 itself, as will be best appreciated from FIGURE 14, is in the nature of four radially extending arms 94 orientated at 90° to each other, each arm consisting of a flat top flange 96 and a vertical reinforcing web 98. It will be noted that the finger receiving passages 86 extend through adjacent arms 94. Each of the arms 94 is provided with a concave pallet seat 100 secured to the upper flange 96 thereof adjacent the outer end. The seats 100 on the arms 94 are arranged in two aligned pairs for the seating reception of a pallet base bar 102. In order to retain each base bar 102 in the corresponding seats, a spring-biased retaining latch 104 is provided. The latch 104 associated with each base bar 102 is pivotally mounted on a rod 106 extending transversely between the pair of arms 94 mounting the corresponding seats 100 and is biased, by a suitable tension spring 108, so as to move the hook defining upper end portion 110 thereof outwardly and into overlying engagement with a seat received bar 102. The spring 108 can be engaged between the corresponding latch 104 below the rod 106 and a second rod 112 also mounted between the arms 94 parallel and inward of the rod 106. The lower portion of each of the base bar retaining latches 104 curves downwardly and outwardly so as to define a camming surface 114 for engagement with the upper end of a vertically projecting activating finger 116 fixed to the dolly beam 46 and projecting upwardly therefrom in vertical alignment with the latch 104. The relationship between each finger 116 and the associated latch 104, noting FIGURES 10 and 11, is such that as the carrying head 56 is raising, each finger 116 will maintain the latch 104 in a position so as to produce an engagement of the latch hook portions 110 with the pallet base bars 102. As the carrying head is lowering, each finger 116 will engage the corresponding camming surface 114 and cam the latch 104 so as to disengage the upper hook portion 110 thereof from the corresponding base bar 102. Thus, between the seating of the pallet base bars 102 in the aligned seats 100 and the spring-biased engagement of the latch bars 104 thereover, there will be a positive retention of the involved pallet 22 during the positioning operation. Incidentally, as the head 56 will rotate 90°, latch release fingers 117 will also be provided on longitudinally orientated bars 119 to operate in the same manner as fingers 116 in the rotated position of head 56.

Figure 6:
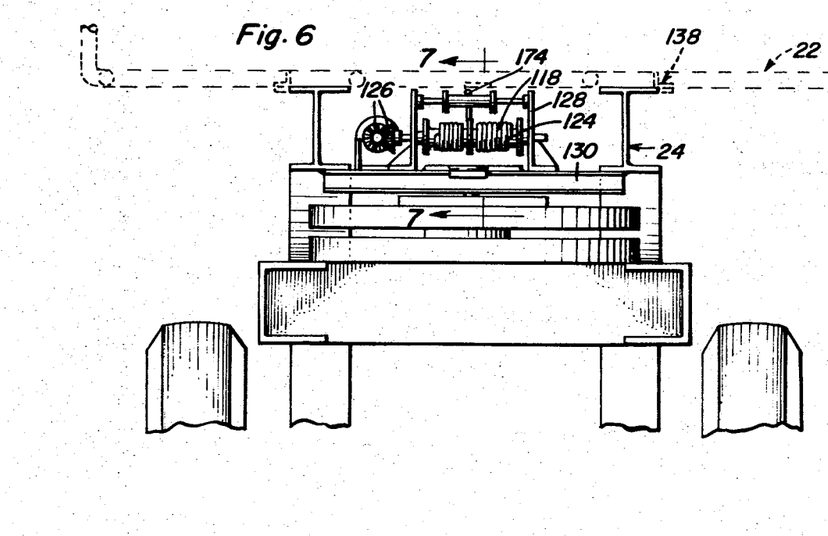
FIGURE 6 is a cross-sectional detail taken substantially on a plane passing along line 6—6 in FIGURE 1.
Figure 7:
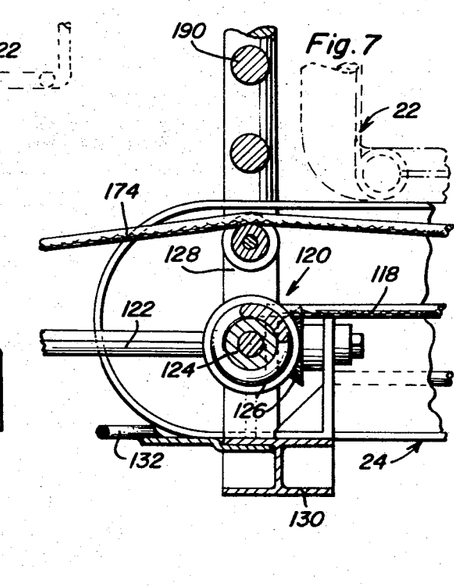
FIGURE 7 is an enlarged cross-sectional detail taken substantially on a plane passing along line 7—7 in FIGURE 6.

The longitudinal movement of the dolly 34 is effected, in the illustrated embodiment, by a winch controlled cable 118. The winch 120 which mounts and controls the dolly positioning cable 118 is mounted at the forward end of the body 20 between the beams 24 and is to be driven in any suitable manner, such as by a power take-off 122 as illustrated in the drawings, the power take-off driving the winch drum 124 through mated bevel gears 126, one on the take-off shaft and one on the drum shaft as will be best appreciated from FIGURES 6 and 7. The winch drum 124 will actually be mounted between two braced upstanding standards 128 which journal the winch drum shaft and which are rigidly affixed to a transverse beam 130 welded or otherwise rigidly affixed to the forward end portions of the two rail forming I-beams 24. A cable loop 132 can be affixed to the beam 130 at the center thereof for use in positioning the trailer body 20 on the cab, assuming wheeled landing gear is not available.

The dolly positioning cable 118 is actually in two sections, a first secured to the forward dolly beam 46 and wound about one side of the winch drum 124 in one direction, and a second cable portion affixed to the rear dolly beam 46, extending rearwardly therefrom about a guide pulley or drum mounted centrally at the rear of the body 20 and then forwardly for wound engagement about the winch drum 124 laterally spaced from the first cable section and wound in the opposite direction therefrom whereby as one cable section is wound in, the other is unwound in an obvious manner so as to effect the longitudinal traveling of the dolly 34.

Once a particular pallet 22 is positioned where desired, it will be temporarily locked in position by suitable pin means extending through the apertured horizontal flange 136 of a pair of angle members 138 paralleling the pallet cross bars 102 immediately outward thereof and in a position so as to directly overlie a series of pin receiving rings 140 fixed along the outer edge of each of the guide rail defining I-beams 24 upon a transverse positioning of the pallet 22. If so desired, rather than providing the pin receiving loops or rings 140 along the outer edges of the beams 24, suitable apertures can be provided directly in the top flanges of the beams 24.

Figure 3:
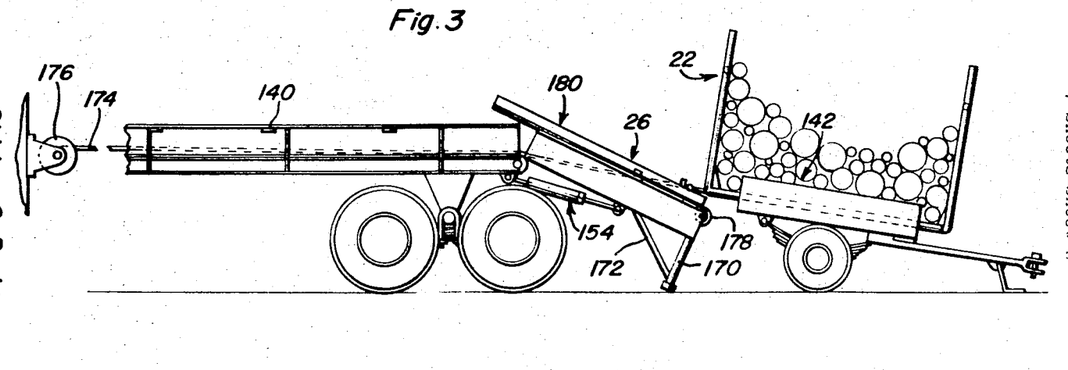
FIGURE 3 is a side elevational view with the loading ramp lowered for the reception of a trailer or wagon mounted loaded pallet.
Figure 4:
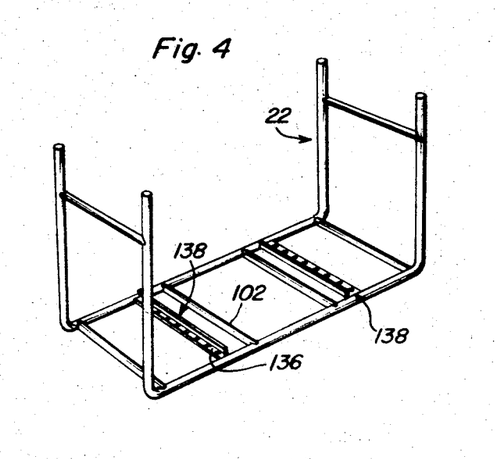
FIGURE 4 is a perspective view of one of the pallets.
Figure 8:
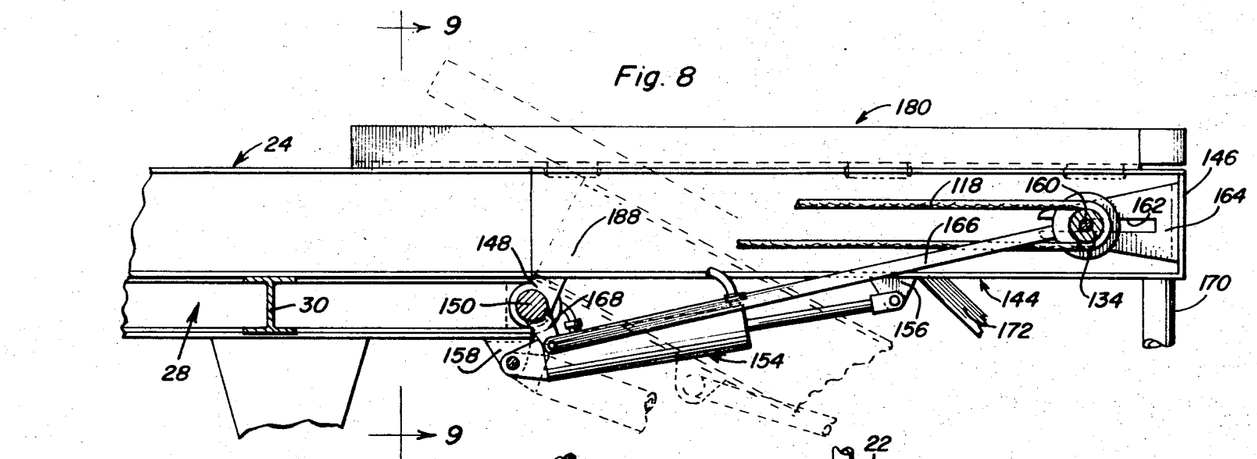
FIGURE 8 is an enlarged cross-sectional detail illustrating the loading ramp and the control system therefor.
Figure 9:
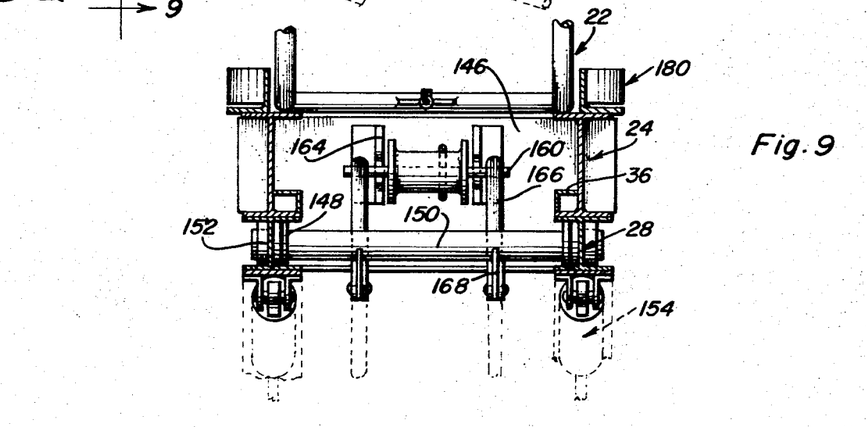
FIGURE 9 is a cross-sectional view taken substantially on a plane passing along line 9—9 in FIGURE 8.

In order to assist in introducing the pallets 22 onto the body 20, either from a conventional two-wheel trailer 142 as illustrated in FIGURE 3 or directly from the ground, it is contemplated that the rear portion of the body be in the nature of a lowerable ramp 26. This ramp 26 is actually formed of a pair of I-beam sections 144 which are of equal size with and form independent continuations of the guide rail defining I-beams 24. The ramp beams 144 are connected at the rear end thereof by a transverse rigid plate 146, as well as any other suitable cross bracing such as might be needed to rigidify the ramp. The ramp 26, noting FIGURE 8, is pivotally mounted by means of a pair of depending forwardly directed ears 148, one rigidly affixed to the lower forward end of each of the ramp beams 144 and fixed to a transverse shaft 150 rotatably mounted, within appropriate bearings 152, to the rear end portions of the underlying rigidifying I-beams 28, the ramp 26, through a rotation of the shaft 150, moving between the full and phantom line positions of FIGURE 8, or more clearly between the positions illustrated in FIGURES 2 and 3. The actual movement of the ramp 26 is effected by a pair of fluid piston and cylinder units 154, each engaged between a depending ear 156 on one of the ramp beams 144 and a depending ear 158 on the rear portion of an aligned body rigidifying beam 28. The ramp raising and lowering units 154 will of course be synchronized in their operation with a retraction of the pistons thereof effecting a downward pivoting of the ramp 26 and a subsequent extension of the pistons effecting an elevation of the ramp 26 so as to align the ramp beams 144 in a common horizontal plane with the body beams 24.

The pulley or drum 134 over which the dolly moving cable 118 is guided has the shaft 160 thereof received within a pair of elongated slots 162 provided longitudinally in a pair of forwardly projecting mounting ears 164 secured to the back plate 146 of the ramp 26. In addition, the opposite ends of the drum shaft 160 are affixed to a pair of forwardly projecting mounting arms 166, the forward ends of which are pivotally pinned to a pair of depending brackets 168 rigid with the ramp mounting shaft 150. In this manner, as the ramp 26 pivots downwardly, the brackets 168 will rotate with the ramp shaft 150 and effect a forward drawing of the arms 166 which in turn results in a forward sliding of the drum shaft 160 in the slots 162 provided therefor. As such, there is an automatic compensation for the increase in the effective length of the cable mounting apparatus brought about by the gap developed between the pivoted ramp and the main body. In other words, were the axis of rotation of the drum or pulley 134 fixed, the pivoting of the ramp 26 would produce an increased tensioning of the cable 118 and either a breaking of the cable 118 or an incomplete pivoting of the ramp 26. This is avoided through an automatic forward moving of the drum 134 simultaneously with the pivoting of the ramp 26. It will of course be appreciated that the relationship between the arms 166 and the mounting brackets 168 therefor is to be such so as to achieve the desired result of synchronizing the movement of the drum 134 with the pivoting of the ramp 26. Incidentally, it will be noted that the shaft 150 provides a smooth surface over which the cable 118 can flex as the ramp is lowered. Further, inasmuch as the winch drum 124 and cable roller 134 are located at approximately mid-height relative to the rail forming I-beams 24, the cable section secured to the rear dolly beam 46 will probably pass under the dolly 34 itself. As such, in order to avoid wear thereon, the lower edges of the two dolly beams 46 can be provided with rollers or other friction reducing surfacing for the accommodation of the return run of the cable 118 should there be a possibility of this return run engaging beneath the dolly 34.

During an actual loading operation, the ramp 26 is moved to its lowered position by the hydraulic units 154, the ramp 26 being stabilized in this position by a pair of depending legs 170 rigid therewith and braced therefrom by diagonal braces 172. An elongated cable 174 is then extended from a power winch 176 mounted adjacent the forward end of the trailer 20 or on the propelling vehicle itself to the ground or wagon carried loaded pallet 22. The cable 174 is engaged with the pallet 22 and the winch 176 activated so as to draw the pallet 22 onto the inclined ramp 26. A cable guiding roller 178 can be provided at the extreme rear end of the ramp 26 for the cable 174 should such be necessary, particularly when raising the pallet directly from the ground.

In order to properly orientate the pallet 22 on the ramp 26 for engagement therewith by the dolly 34, a pair of side guide bars 180 are provided on the ramp I-beams 144. Noting FIGURE 5, it will be appreciated that these guide bars 180 are in the nature of angle irons with the horizontal flanges 182 thereof being hingedly engaged with the ramp I-beams 144 for movement between a position wherein the vertical flanges 184 thereof project perpendicularly upward from the upper flanges of the beams 144, in which position the guide bars 180 are releasably secured by suitable pins 186, and a second position pivoted outwardly and downwardly so as to be disposed in a substantially out-of-the-way position below the top flanges of the ramp beams 144.

Figure 5:
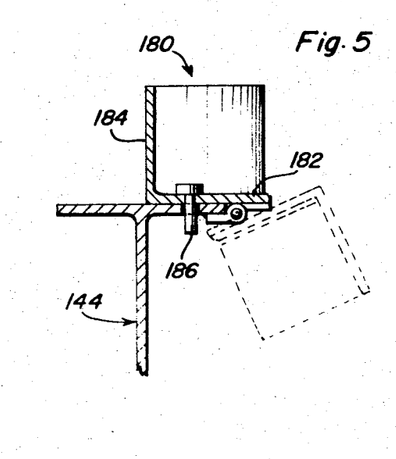
FIGURE 5 is an enlarged cross-sectional detail taken substantially on a plane passing along line 5—5 in FIGURE 1.

The guide bars 180, in the full line position of FIGURE 5, function so as to centralize a received pallet 22 on the beams 144. Noting FIGURES 3 and 8, it will be appreciated that the guide bars 180 actually project forwardly into free overlying relation to the rear portions of the main trailer beams 24. Once a pallet 22 is received on the ramp 26, the ramp 26 is elevated to the full line position of FIGURE 2 and the dolly 34 moved outwardly between the beams 144 in underlying relation to the loaded pallet 22. Incidently, in order to enable this movement of the dolly 34 between the ramp beams 144, it will be appreciated that each of the ramp beams 144 includes a track defining angle bar 188 similar to the track or surface defining angle bars 36 associated with the aligned I-beams 24. Upon being positioned beneath the pallet, the dolly is raised so as to lift the pallet and then moved forwardly with the dolly 34, at some point prior to arrival at the final location of the pallet 22, being activated so as to rotate the pallet 22 90° or transversely across the trailer 20 after which the pallet is deposited at the forwardmost location. The initial pallet 22 loaded will be located immediately adjacent the forward load stabilizing rack 190 affixed at the forward end of the trailer 20 immediately behind the cab with the subsequent pallets 22 being stacked sequentially thereagainst.

Figure 16:
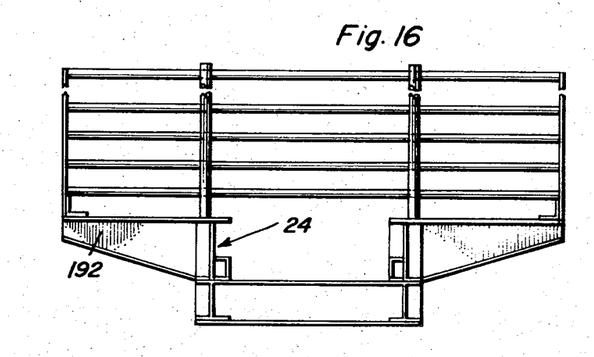
FIGURE 16 illustrates a modified form of transport body, laterally expanded for the accommodation of larger pallets.

With reference to FIGURE 16, it should be appreciated that various modifications can be made in the pallet receiving body, such as by the utilization of outriggers or wings 192 should such be necessary for the accommodation of heavier loads or pallets of a greater size.

Figure 17:
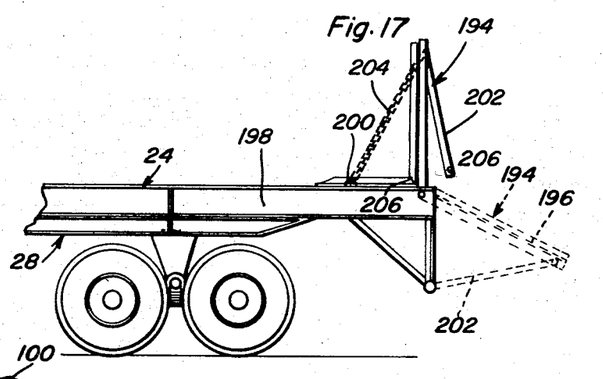
FIGURE 17 illustrates a modified form of loading ramp.

FIGURE 17 illustrates a simplified form of ramp 194 which can be manually moved from an upstanding pallet retaining position as illustrated in full lines in FIGURE 17 to a downwardly inclined loading position, as illustrated in phantom lines in FIGURE 17. The simplified ramp 194 will include a pair of opposed pallet positioning guide bars 196 with the main body 198 of the trailer immediately adjacent the ramp 194 having a pair of similar aligned guide sections 200 whereby, during the loading of a pallet, the pallet will be pulled up the ramp 194 and directly onto the main body 198 of the trailer where it will be picked up by the dolly. A suitable bracing leg 202 will be pivotally associated with the ramp 194 and will, when the ramp is lowered, engage in a bracing manner against any suitable rigid portion of the trailer substructure. In its elevated or pallet retaining position, the ramp 194 can be stabilized by chains 204 releasably engaged between the upper or outer end of the ramp 194 and the trailer body 198, as well as through an abutting engagement, generally indicated by reference numeral 206, which prevents a forward folding of the ramp 194 and limits the forward movement of the ramp 194 to a vertical position so as to form an upright barrier.

From the foregoing detailed description, it will be appreciated that a highly unique pallet loading system has been devised. This system enables an operator to quickly load and compactly position a plurality of pallets from either a single source or a plurality of different sources, the automatic nature or the loading and positioning apparatus making the entire operation substantially a one man operation. In the actual loading operation, the rear ramp is lowered and the trailer positioned for the reception of a pallet on the lowered ramp. Incidently, it will be appreciated that, through the utilization of the hydraulic units 154 to position the ramp 26, the ramp can be so located as to allow for a slight elevation of the bracing legs 170 above the ground whereby the trailer 20 is maneuverable even with the ramp in a lowered pallet receiving position. A winch cable is then secured to either a wagon or a ground supported pallet and the pallet winched onto the inclined ramp, after which the ramp is elevated and the pallet raising and positioning dolly moved outward thereonto beneath the ramp supported pallet. The dolly then is activated so as to elevate the carrying head 56 which in turn grips and raises the pallet. Upon a raising of the pallet, the dolly moves longitudinally forward, rotating the pallet at an appropriate point sometime after the initial elevating of the pallet, and subsequently lowering so as to deposit the transversely orientated pallet at the forwardmost position on the trailer 20. The dolly is then moved rearwardly for a repeat of this operation. When it becomes necessary to unload the pallets, if the pallets are to be removed from the rear of the trailer, after an emptying of the pallets in any suitable manner, such as through the utilization of an overhead type crane or a front end loader, the pallets are rotated lengthwise, hooked together, anchored to a fixed object, such as a tractor or tree, and the trailer driven out from beneath the pallets. It will be appreciated that the dolly is at all times available for positioning the individual pallets as required for the most expeditious unloading operation. For example, when unloading with a front end loader, it is desirable that the individual pallets be positioned lengthwise on the trailer. Accordingly, the rearmost pallet will be raised by the dolly, moved rearwardly a sufficient distance so as to enable a rotation thereof, lowered, and subsequently unloaded. After an unloading of the pallet, the pallet will be raised, rotated back transversely across the trailer, and moved to the rearmost point where it will be pinned in position while the dolly returns to repeat the operation on the next adjacent pallet. After all of the pallets have been emptied in this manner, they can be removed in the manner suggested above.

While the apparatus of the instant invention has been set forth as particularly adapted for use in conjunction with wood pallets, it should of course be appreciated that any bulk loads can be handled in a similar manner.

What is claimed as new is as follows:

1. Loading apparatus for pallets or the like comprising a transporting body including a forward stacking end and a rear loading end, load handling dolly means mounted for longitudinal traveling along said body, means for propelling said dolly means along said body, said dolly means including load elevating means for effecting a vertical movement of a superimposed load, and load turning means for effecting a rotation of an elevated load at least approximately 90°, said transporting body including a load supporting upper surface defined along the length thereof, said dolly means being mounted below said surface, said load elevating means being selectively extensible above said load supporting surface for the raising of a superimposed load therefrom, said dolly means being mounted for travel along a path defined centrally of said body, dividing said load supporting upper surface into laterally spaced parallel portions, a longitudinally extending ramp mounted on the rear loading end of said transporting body, and means for effecting a movement of said ramp between a downwardly angled loading position and an upper body loaded position, said dolly means comprising forward and rearward support wheels, said body including wheel receiving track means defined longitudinally therealong, and means for retaining said dolly wheels within said track means for movement solely in a longitudinal direction therealong, said load elevating means comprising an enlarged carrying head a mounting shaft affixed to said carrying head and depending vertically therefrom, vertical guide means on said dolly means receiving said shaft for guided vertical movement, and means engaged with said shaft for effecting a selective extension and retraction thereof, along with the carrying head mounted thereon.

2. The apparatus of claim 1 including lock means on said carrying head releasably engageable with a superimposed load for retention of the load on the carrying head upon a vertical movement of the carrying head into supporting engagement with said load.

3. The apparatus of claim 1 wherein said means for effecting the extension and retraction of the shaft comprises a pair of diametrically opposed pins rigid with and projecting radially from said shaft, a pair of rigid links associated with each pin, each pair of links having the inner ends thereof pivoted to the associated pin and extending outwardly therefrom in opposite directions at an angle to each other, each pair of links terminating in spaced outer ends, and means for selectively moving the outer ends of each pair of links toward and away from each other in a common plane so as to vary the elevation of the pin pivotally engaged with the inner ends thereof, and hence vary the elevation of the shaft associated carrying head.

4. The apparatus of claim 1 wherein said load turning means includes a bearing unit securing said carrying head to the upper end of said shaft whereby rotation of the carrying head relative to the shaft can be effected, and means for fixing the head relative to the shaft in at least two rotatably adjusted positions.

5. The apparatus of claim 4 including lock means on said carrying head for releasable locking engagement with a superimposed load for the retention of the load on the carrying head during the elevating and rotating operations.

6. The apparatus of claim 5 wherein said means for effecting the extension and retraction of the shaft comprises a pair of diametrically opposed pins rigid with and projecting radially from said shaft, a pair of rigid links associated with each pin, each pair of links having the inner ends thereof pivoted to the associated pin and extending outwardly therefrom in opposite directions at an angle to each other, each pair of links terminating in spaced outer ends, and means for selectively moving the outer ends of each pair of links toward and away from each other in a common plane so as to vary the elevation of the pin pivotally engaged with the inner ends thereof, and hence vary the elevation of the shaft and associated carrying head.

7. The apparatus of claim 6 wherein said wheel receiving track means extends beyond the transporting body and along a substantial portion of said ramp so as to enable movement of the dolly means onto said ramp and beneath a load positioned thereon.

8. The apparatus of claim 7 wherein the means for propelling said dolly means comprises a winch mounted adjacent the forward end of said transporting body, a cable guide mounted adjacent the rear end of said body, cable means mounted on said winch, a first portion of said cable means extending rearwardly from the winch into engagement with the forward end of said dolly means, a second portion of the cable means extending rearwardly from the winch, about the rearwardly located cable guide, and forwardly into engagement with the rearward end of the dolly means whereby a driving of the winch in either direction will effect a corresponding movement of the dolly means along the transporting body.

9. The apparatus of claim 8 wherein said cable guide is mounted on said ramp toward the rear thereof, and means engaged with the cable guide for varying the longitudinal position of the cable guide in response to the pivotal adjustment of the ramp so as to maintain a substantially constant tension on the cable means.

10. The apparatus of claim 9 wherein said ramp means includes guide rails along the opposite sides of the upper surface thereof to center a received load, said guide rails being movable between an upright load centering position and a lowered out-of-the-way load unloading position.

11. The apparatus of claim 10 including means for automatically engaging the lock means with a superimposed load upon a raising of the carrying head, and automatically disengaging the lock means upon a lowering of the carrying head.

12. Loading apparatus for pallets or the like comprising a transporting body including a forward stacking end and a rear loading end, load handling dolly means mounted for longitudinal traveling along said body, means for propelling said dolly means along said body, said dolly means including load elevating means for effecting a vertical movement of a superimposed load, and load turning means for effecting a rotation of an elevated load at least approximately 90°, said load elevating means comprising an enlarged carrying head, a mounting shaft affixed to said carrying head and depending vertically therefrom, vertical guide means on said dolly means receiving said shaft for guided vertical movement, and means engaged with said shaft for effecting a selective extension and retraction thereof, along with the carrying head mounted thereon, said means for effecting the extension and retraction of the shaft comprising a pair of diametrically opposed pins rigid with and projecting radially from said shaft, a pair of rigid links associated with each pin, each pair of links having the inner ends thereof pivoted to the associated pin and extending outwardly therefrom in opposite directions at an angle to each other, each pair of links terminating in spaced outer ends, and means for selectively moving the outer ends of each pair of links toward and away from each other in a common plane so as to vary the elevation of the pin pivotally engaged with the inner ends thereof, and hence vary the elevation of the shaft and associated carrying head.

13. Loading apparatus for pallets or the like comprising a transporting body including a forward stacking end and a rear loading end, load handling dolly means mounted for longitudinal traveling along said body, means for propelling said dolly means along said body, said dolly means including load elevating means for effecting a vertical movement of a superimposed load, and load turning means for effecting a rotation of an elevated load at least approximately 90°, said transporting body including a load supporting upper surface defined along the length thereof, said dolly means being mounted below said surface, said load elevated means being selectively extensible above said load supporting surface for the raising of a superimposed load therefrom, said dolly means being mounted for travel along a path defined centrally of said body, dividing said load supporting upper surface into laterally spaced parallel portions, a longitudinally extending ramp mounted on the rear loading end of said transporting body, and means for effecting a movement of said ramp between a downwardly angled loading position and an upper body loaded position, said dolly means comprising forward and rearward support wheels, said body including wheel receiving track means defined longitudinally therealong, and means for retaining said dolly wheels within said track means for movement solely in a longitudinal direction therealong, said wheel receiving track means extending beyond the transporting body and along a substantial portion of said ramp so as to enable movement of the dolly means onto said ramp and beneath a load positioned thereon.

14. The apparatus of claim 13 wherein the means for propelling said dolly means comprises a winch mounted adjacent the forward end of said transporting body, a cable guide mounted adjacent the rear end of said body, cable means mounted on said winch, a first portion of said cable means extending rearwardly from the winch into engagement with the forward end of said dolly means, a second portion of the cable means extending rearwardly from the winch, about the rearwardly located cable guide, and forwardly into engagement with the rearward end of the dolly means whereby a driving of the winch in either direction will effect a corresponding movement of the dolly means along the transporting body.

15. The apparatus of claim 14 wherein said cable guide is mounted on said ramp toward the rear thereof, and means engaged with the cable guide for varying the longitudinal position of the cable guide in response to the pivotal adjustment of the ramp so as to maintain a substantially constant tension on the cable means.

16. A load receiving and transporting body, said body including a load supporting upper surface along the length thereof, a traveling dolly mounted on said body for travel longitudinally therealong, said dolly comprising front and rear support wheels, a framework mounting said wheels, a vertically extending guide affixed to said framework centrally between said wheels, a vertically elongated shaft slidably received in said guide for selective extension and retraction therefrom, means for selectively extending and retracting said shaft, an enlarged horizontal carrying head positioned over the upper end of said shaft, means mounting said carrying head on the upper end of said shaft for extension and retraction therewith and for rotation about the vertical axis of said shaft, means for positioning said carrying head in a plurality of rotatably adjusted positions, means on said carrying head for receiving and automatically stabilizing a superimposed load upon an extension thereof into engagement with the load, and means for propelling said dolly both forwardly and rearwardly along said transporting body.

17. Loading apparatus for pallets or the like including an elongated transport body, load handling dolly means mounted for longitudinal travelling along said body, means for propelling said dolly means along said body, said dolly means including load elevating means for effecting a vertical movement of a superimposed load, and load turning means for effecting a rotation of an elevated load at least approximately 90°, said transport body including a load supporting upper surface defined along the length thereof, said dolly means being mounted relative to said load supporting surface whereby said load elevating means is selectively extensible between a first lowered position wherein a superimposed load will rest on said load supporting surface and a second extended position wherein a superimposed load will be raised above said load supporting surface, said dolly means comprising forward and rearward support wheels, said body including a wheel receiving track means defined longitudinally therealong, and means for retaining said dolly wheels within said track means for movement solely in a longitudinal direction therealong, said load elevating means comprising an enlarged carrying head, mounting means affixed to said carrying head and depending therefrom, said mounting means including a bearing unit for said carrying head whereby a rotation of said carrying head can be effected, said bearing unit constituting the aforementioned load turning means, means for affixing said head in at least two rotatably adjusted positions, vertical guide means on said dolly means cooperating with said mounting means for guided vertical movement thereof.

18. Loading apparatus for pallets or the like comprising an elongated transporting body, load handling dolly means mounted for longitudinal travelling along said body, means for propelling said dolly means along said body, said dolly means including load elevating means for effecting a vertical movement of a superimposed load, and load turning means for effecting a rotation of an elevated load at least approximately 90°, said transporting body including a load supporting upper surface defined along the length thereof, said dolly means being mounted below said surface, said load elevating means being selectively extensible above said load supporting surface for the raising of a superimposed load therefrom, said load elevating means including an enlarged carrying head for raising engagement with a superimposed load, and lock means on said carrying head releasably lockable with a superimposed load upon an upward movement of the carrying head into supporting engagement therewith, said lock means being automatically releasable from a superimposed supported load upon a lowering of the carrying head.

References Cited
UNITED STATES PATENTS

| | | |
|---|---|---|
| 1,807,268 | 5/1931 | Woodruff. |
| 2,144,410 | 1/1939 | Ludington. |
| 2,544,456 | 3/1951 | Gross ____________ 214—83.24 |
| 2,933,053 | 4/1960 | Mellam. |
| 3,142,394 | 7/1964 | Schwartz ____________ 214—85 |
| 3,283,926 | 11/1966 | Eckhardt et al. |

ALBERT J. MAKAY, Primary Examiner

U.S. Cl. X.R.

104—48; 214—38, 83.24, 517